United States Patent
Borrelli et al.

(10) Patent No.: US 10,330,830 B2
(45) Date of Patent: Jun. 25, 2019

(54) DISPLAY DEVICE WITH LIGHT DIFFUSIVE GLASS PANEL

(71) Applicant: Corning Incorporated, Corning, NY (US)

(72) Inventors: Nicholas Francis Borrelli, Elmira, NY (US); Sasha Marjanovic, Painted Post, NY (US); Timothy James Orsley, San Jose, CA (US)

(73) Assignee: CORNING INCORPORATED, Corning, NY (US)

( * ) Notice: Subject to any disclaimer, the term of this patent is extended or adjusted under 35 U.S.C. 154(b) by 927 days.

(21) Appl. No.: 14/605,255

(22) Filed: Jan. 26, 2015

(65) Prior Publication Data

US 2015/0131156 A1 May 14, 2015

Related U.S. Application Data

(63) Continuation of application No. 13/990,551, filed as application No. PCT/US2011/062517 on Nov. 30, 2011, now Pat. No. 8,957,873.

(60) Provisional application No. 61/418,023, filed on Nov. 30, 2010.

(51) Int. Cl.
| | |
|---|---|
| *G02B 5/02* | (2006.01) |
| *C03C 15/00* | (2006.01) |
| *C03C 19/00* | (2006.01) |
| *G06F 3/041* | (2006.01) |

(52) U.S. Cl.
CPC ............. *G02B 5/021* (2013.01); *C03C 15/00* (2013.01); *C03C 19/00* (2013.01); *G02B 5/0278* (2013.01); *G06F 3/041* (2013.01); *G02B 5/02* (2013.01)

(58) Field of Classification Search
CPC ......... G02B 5/021; G06F 3/041; C03C 15/00; C03C 19/00; C03B 2201/60; C03B 2201/50; C03B 2201/32
See application file for complete search history.

(56) References Cited

U.S. PATENT DOCUMENTS

| | | | |
|---|---|---|---|
| 6,771,335 B2 | 8/2004 | Kimura et al. | |
| 6,858,657 B2 | 2/2005 | Komiya et al. | |
| 7,031,061 B2 | 4/2006 | Ito | |
| 7,161,743 B2 | 1/2007 | Nishida et al. | |
| 8,713,967 B2 | 5/2014 | Danielson et al. | |

(Continued)

FOREIGN PATENT DOCUMENTS

| | | |
|---|---|---|
| CN | 101215097 | 9/2010 |
| EP | 2177485 | 4/2010 |

(Continued)

OTHER PUBLICATIONS

Fouckhardt et al., "Multiple of glass surface roughness morphologies as a tool box for dosed optical scarttering", Applied Optics, vol. 49, pp. 1364-1372, Feb. 18, 2010, Doc ID 119778.*

(Continued)

*Primary Examiner* — Kevin M Nguyen

(57) ABSTRACT

A display device having a display element, such as a light-emitting device or a light-reflecting device, such as a MEMS device, and a glass touch panel covering the display element, the outer surface of the panel being textured. The panel is thin, having a thickness of 1.1 mm or less between the inner and outer surfaces.

10 Claims, 6 Drawing Sheets

(56) References Cited

U.S. PATENT DOCUMENTS

| | | | |
|---|---|---|---|
| 2005/0016583 A1* | 1/2005 | Blieske | C03C 17/23 |
| | | | 136/256 |
| 2005/0245382 A1* | 11/2005 | Iwahashi | C03C 3/06 |
| | | | 501/54 |
| 2007/0108900 A1 | 5/2007 | Boek et al. | |
| 2008/0308151 A1* | 12/2008 | Den Boer | H01L 31/02168 |
| | | | 136/256 |
| 2009/0004878 A1* | 1/2009 | Ohnuma | H01L 21/76254 |
| | | | 438/759 |
| 2009/0123698 A1* | 5/2009 | Nishino | C03C 17/008 |
| | | | 428/141 |
| 2011/0017287 A1 | 1/2011 | Borrelli et al. | |
| 2011/0069030 A1 | 3/2011 | Nozawa | |
| 2011/0094577 A1* | 4/2011 | Chatterjee | C03C 17/253 |
| | | | 136/256 |
| 2011/0126890 A1 | 6/2011 | Borrelli et al. | |
| 2011/0165380 A1* | 7/2011 | Gahagan | C03C 3/085 |
| | | | 428/156 |

FOREIGN PATENT DOCUMENTS

| | | |
|---|---|---|
| JP | 2000114772 | 4/2000 |
| JP | 20011194515 | 7/2001 |
| JP | 2003108313 | 4/2003 |
| JP | 2005038288 | 2/2005 |
| JP | 2005038288 A | 2/2005 |
| JP | 2007034027 | 2/2007 |
| JP | 2007041430 A | 2/2007 |
| JP | 2008096781 | 4/2008 |
| JP | 2010145731 A | 7/2010 |
| JP | 2010204553 | 9/2010 |

OTHER PUBLICATIONS

XP007920279 "Corning XG Display Grade Glass Substrates," 20060101, Jan. 1, 2006 (Jan. 1, 2006), pp. 1-4.
EP16192442 Search Report dated Feb. 6, 2017, European Patent Office.
CN201180057716.X Chinese Notice of First Office action dated Jul. 30, 2015.
International Search Report and Written Opinion PCT/US2011/062517 dated Mar. 2, 2012.
Japanese Second Office Action App 2013542116 dated Jun. 27, 2016.
Taiwan First Office Action App 100144063 dated Jun. 7, 2016.
JP2013-542116 First Office Action dated Oct. 6, 2015.

* cited by examiner

DISPLAY DEVICE WITH LIGHT DIFFUSIVE GLASS PANEL

CROSS-REFERENCE TO RELATED APPLICATIONS

This application is a continuation of U.S. patent application Ser. No. 13/990,551 filed on May 30, 2013, which claims the benefit of priority under 35 U.S.C. § 119 of U.S. Provisional Application No. 61/418,023 filed on Nov. 30, 2010, and also claims the benefit of priority under 35 U.S.C. § 365 of International Patent Application Serial No. PCT/US2011/062517 filed on Nov. 30, 2011, designating the United States of America the contents of which are relied upon and incorporated herein by reference in their entirety.

FIELD

The present specification generally relates to display devices and, more specifically, to electronic display devices having a glass panel.

SUMMARY

Disclosed herein is a display device comprised of a display element and a glass panel covering the display element. The display element can be either a light-emitting device, such as a backlit device, or a light-reflecting device (such as a device with no backlighting, e.g. reflects ambient light, such as a MEMS display, or an electrophoretic display (EPD)), and the display element is configured to display an image toward the glass panel. The glass panel is light diffusive, and preferably is scratch resistant and thermally, chemically, and mechanically robust. In some embodiments, the glass panel is a glass touch panel. The glass panel can be either low alkali, or alkali-free, and in some embodiments contains no alkali.

In some embodiments, the glass panel provides greater than 90% total transmittance and haze greater than 75%.

In some embodiments, the display element is a microelectromechanical system (MEMS) device, an electrophoretic display (EPD, a liquid crystal display (LCD) device, a digital light processing (DLP) device, or a liquid crystal on silicon (LCOS) device.

In a first aspect, a display device is disclosed herein comprised of a light-reflecting device and a glass touch panel covering the light-reflecting device. In one set of embodiments, the light-reflecting device is a MEMS device, such that the display device disclosed herein is comprised of a MEMS device and a glass touch panel covering the MEMS device. In another set of embodiments, the light-reflecting device is an EPD device, such that the display device disclosed herein is comprised of an EPD device and a glass touch panel covering the EPD device.

In one set of embodiments, a display device is disclosed herein comprising a MEMS device and a glass touch panel covering the MEMS device. The glass touch panel contains no alkali, has a CTE of $50 \times 10^{-7}/^\circ$ C. or less, and a scatter ratio (diffuse transmittance divided by total transmittance) of 0.5 or more, the panel having opposing inner and outer surfaces, the inner surface facing the MEMS device in an inward direction, and the outer surface facing away from the MEMS device in an outward direction, the outer surface being textured, the inner surface being non-textured, the panel having a thickness of 1.1 mm or less between the inner and outer surfaces, the panel having a total forward transmission of 90% or more in the outward direction.

In another set of embodiments, a display device is disclosed herein comprising a MEMS device and a glass touch panel covering the MEMS device. The glass touch panel contains no alkali, has a CTE of $50 \times 10^{-7}/^\circ$ C. or less, and a scatter ratio (diffuse transmittance divided by total transmittance) of 0.75 or more, the panel having opposing inner and outer surfaces, the inner surface facing the MEMS device in an inward direction, and the outer surface facing away from the MEMS device in an outward direction, the outer surface being textured, the inner surface being non-textured, the panel having a thickness of 1.1 mm or less between the inner and outer surfaces, the panel having a total forward transmission of 90% or more in the outward direction.

In a second aspect, a display device is disclosed herein comprised of a display element and a cover glass covering the display element. In one set of embodiments, the display element is a light-reflective device, such that the display device disclosed herein is comprised of a light-reflective device having a substrate surface facing outward and a cover glass bonded to and covering the light-reflective device. The cover glass can be an ion-exchanged strengthened glass, such as Corning Incorporated's Gorilla® glass.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of display apparatus comprising a glass panel and methods of making the same, examples of which are illustrated in the accompanying drawings.

Figure 1:
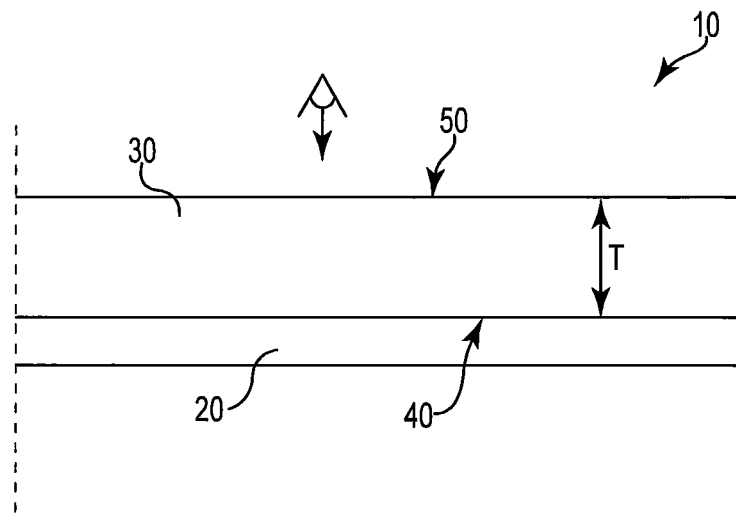
FIG. 1 is a cross-sectional schematic view of a display device as disclosed herein comprised of a light-emitting device and a glass panel covering the light-emitting device.

Referring to FIG. 1, a display device 10 is disclosed herein comprised of a display element 20 and a glass panel 30 covering the display element 20. The display element 20 is configured to display an image toward the glass panel 30. The panel 30 has an inner surface 40 and outer surface 50, i.e. opposing inner and outer surfaces 40, 50. The inner surface 40 faces the display element 20 in an inward direction, and the outer surface 50 faces away from the light-emitting device 20 in an outward direction. Thus, the display element 20 is configured to display an image toward the inner surface 40 of the glass panel 30. The outer surface 50 is textured so as to be light diffusive. Thus, the glass panel 30 is light diffusive. The inner surface 40 is not textured, i.e. non-textured. The panel 30 has a thickness "T".

In some embodiments, the thickness of the glass panel is about 1.1 mm or less, in some embodiments about 0.7 mm or less, and in some embodiments about 0.5 mm or less.

In some embodiments, the inner surface 40 is disposed on or near the display element 20. In some embodiments, the inner surface 40 is bonded to the display element 20. In some embodiments, the inner surface 40 directly contacts the display element 20.

Preferably, the glass panel 30 provides high light transmission and low backscatter for the light impinging upon the inner surface 40 of the glass panel 30. In some embodiments, the glass panel 30 has a total forward transmission of 90% or more in the outward direction.

In some embodiments, the inner surface 40 of the glass panel 30 is flat, such as in embodiments where the display element 20 is a MEMS device; in some of these embodiments the glass panel 30 is selected from a fusion drawn glass, a polished glass, or a polished fusion drawn glass; in some embodiments the inner surface 40 of the glass panel 30 is a polished inner surface.

In some embodiments, the glass panel 30 is not coated. In some embodiments, the outer surface 50 of the glass panel 30 is not coated. In some embodiments, no anti-reflective coating is present on the outer surface 50 of the glass panel 30.

In some embodiments, the correlation length of the outer surface 50 of the glass panel 30 is greater than 500 nm and lower than 2 microns. In some embodiments, the correlation length of the outer surface of the glass panel is greater than 750 nm and lower than 1.5 microns.

In some embodiments, the RMS roughness of the outer surface 50 of the glass panel 30 is greater than 250 nm and smaller than 1.5 microns. In some embodiments, the RMS roughness of the outer surface of the glass panel is greater than 500 nm and smaller than 1.25 microns.

In some embodiments, the outer surface of the glass panel exhibits a cosine corrected bidirectional transmittance distribution function (ccBTDF) of greater than 0.07 $(sr)^{-1}$ between −30 and +30 degrees about a normal axis to the outer surface of the glass panel.

In some embodiments, the outer surface of the glass panel exhibits a ccBTDF of greater than 0.10 $(sr)^{-1}$ between −20 and +20 degrees about a normal axis to the outer surface of the glass panel.

In some embodiments, the glass panel has a scatter ratio of 0.5 or more for all wavelengths between 300 and 1200 nm; in some embodiments, the glass panel has a scatter ratio of 0.75 or more for all wavelengths between 300 and 1200 nm; in some embodiments, the glass panel has a scatter ratio of 0.80 or more for all wavelengths between 300 and 1200 nm; in some embodiments, the glass panel has a scatter ratio of 0.85 or more for all wavelengths between 300 and 1200 nm; in some embodiments, the glass panel has a scatter ratio of 0.90 or more for all wavelengths between 300 and 1200 nm; and in some embodiments, the glass panel has a scatter ratio of 0.95 or more for all wavelengths between 300 and 1200 nm.

The glass panel is preferably scratch resistant, and thermally, chemically, and mechanically robust. In some embodiments, the glass panel is a glass touch panel. The glass panel is either low alkali, or alkali-free, and in some embodiments contains no alkali. By "low-alkali" is meant less than 2 wt % alkali. By "alkali-free" is meant essentially no alkali, where trace amounts might be present in the glass.

In some embodiments, the CTE of the glass panel matches a CTE of at least a portion of the display element. In some embodiments, the CTE of the glass panel is within ±10% of a CTE of at least a portion of the display element. In some embodiments, the glass panel has a CTE of less than $60 \times 10^{-7}/°$ C., and in some embodiments, a CTE of $50.0 \times 10^{-7}/°$ C. or less. In some embodiments, the glass panel has a CTE of between $30.0 \times 10^{-7}/°$ C. and $50.0 \times 10^{-7}/°$ C.

The outer surface of the glass panel can be textured, such as by lapping, sandblasting or hydro-blasting, chemical etching and combinations thereof, to provide appropriate total transmittance and haze. The texture obtained will provide a selected range of characteristic sizes and shapes in order to provide desired optical properties. In some embodiments, the texture comprises smoothed craters, with a characteristic diameter size in the micrometer range, in some embodiments 1 to 5 μm, such as obtained by a two-step method: a first step of lapping or sandblasting that causes micro-cracks in the glass surface and a second step of acid etching, which preferentially starts on the edges of micro-cracks and rounds the edges to lead to a smoother pattern. The first step can comprise media lapping or blasting the glass surface with a stream of fine abrasive particles, which is mixed in slurry with deionized (DI) water. In the case of lapping, such slurry drips between glass and a lapping plate, while in the case of sandblasting, slurry is propelled with compressed air. Water is combined with the abrasive to allow the use of finer abrasive particles than with air only, which overall produces fewer fractures on the surface as the water acts as a damping medium on the impacting particles. The second step (acid etching) partially modifies the texture obtained after the first step and restores the glass surface strength after media lapping or blasting, which causes micro-cracks in the glass surface. The result is a highly light diffusive surface with still high total transmittance, which allows improvement of light usage by decreasing the amount of reflected rays.

In one embodiment, the glass panel is comprised of Corning Incorporated's EAGLE XG® glass. In another embodiment, the glass panel is comprised of Corning Incorporated's Gorilla® glass.

FIGS. 2-7 relate to various glass panels formed from Corning Incorporated's EAGLE XG® glass and processed by a two-step method as outlined above, wherein: an abrasive solution was utilized which used alumina particles with a fine mesh (#600, corresponding to 5 to 20 μm particle size, with a median size at 10 μm), the alumina being used for its hardness, and the fine particle distribution being used to create small micro-cracks in the glass surface, wherein the load of the solution was comprised between 20 and 80% by weight of alumina in water; for blasting conditions, the treatment time influenced the surface fraction where abrasive impacts are created; samples were etched after the sandblasting or lapping step to partially modify the texture obtained after the first step and to restore the glass surface strength, as media blasting causes micro cracks in the glass surface, wherein a 1:1:20 solution of HF:HCl:H2O was utilized for 5-15 minutes of etching was used; and all samples were rinsed and cleaned after etching step.

Figure 2:
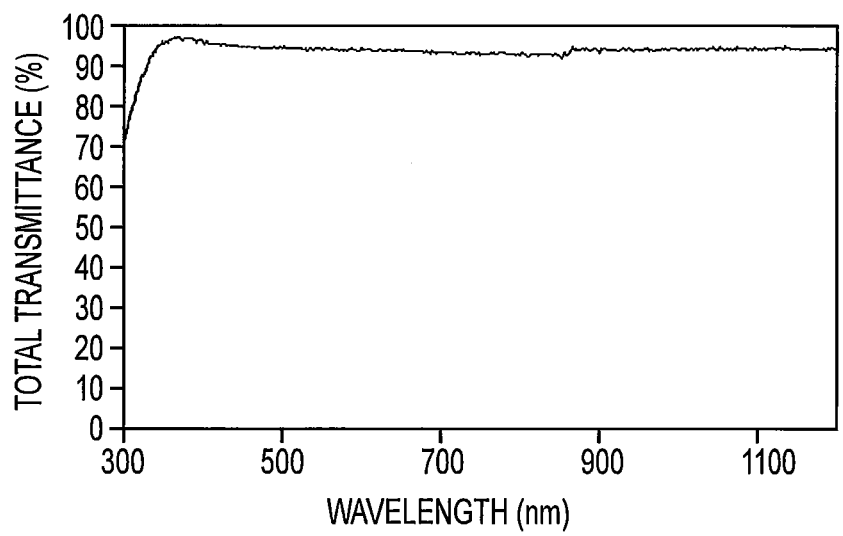
FIG. 2 shows total transmittance after media blasting and etching for a glass panel formed from Corning Incorporated's EAGLE XG® glass.

FIG. 2 shows total transmittance after media blasting and etching for the light diffusive glass panel.

Figure 3:
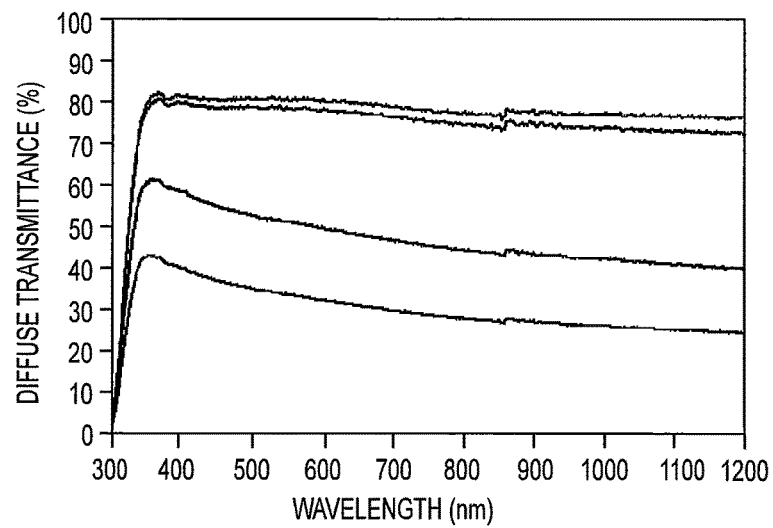
FIG. 3 shows four different haze textures (ultra-high, high, medium and low haze textures, from top to bottom) to select for a glass panel formed from Corning Incorporated's EAGLE XG® glass.

FIG. 3 shows four different haze textures (ultra-high, high, medium and low haze textures, from top to bottom) to select for a glass panel.

Figure 4:
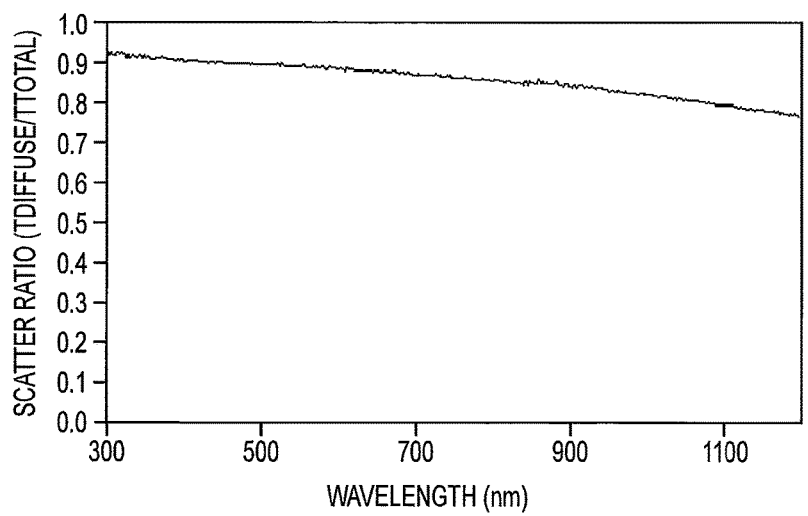
FIG. 4 shows the haze measurements (i.e. scatter ratio, defined as the ratio of diffuse transmittance divided by total transmittance) for a high haze light diffusive glass panel formed from Corning Incorporated's EAGLE XG® glass.

FIG. 4 shows the haze measurements (i.e. scatter ratio, defined as the ratio of diffuse transmittance divided by total transmittance) for a high haze light diffusive glass panel.

Figure 5:
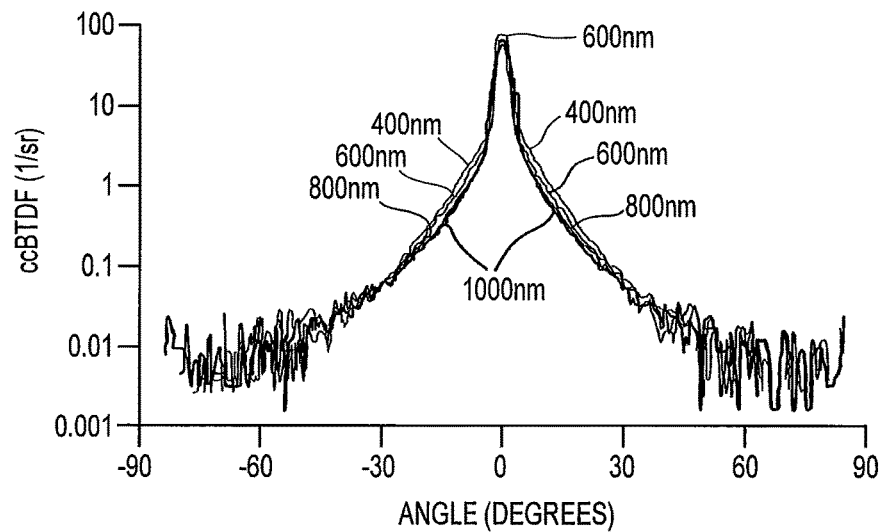
FIG. 5 shows angular scattering (i.e. corrected bidirectional transmittance distribution function (ccBTDF) in units of $(sr)^{-1}$) for a medium haze light diffusive glass panel at 400, 600, 800 and 1000 nm, formed from Corning Incorporated's EAGLE XG® glass.

FIG. 5 shows angular scattering (i.e. corrected bidirectional transmittance distribution function (ccBTDF) in units of $(sr)^{-1}$) for a medium haze light diffusive glass panel at 400, 600, 800 and 1000 nm.

Figure 6:
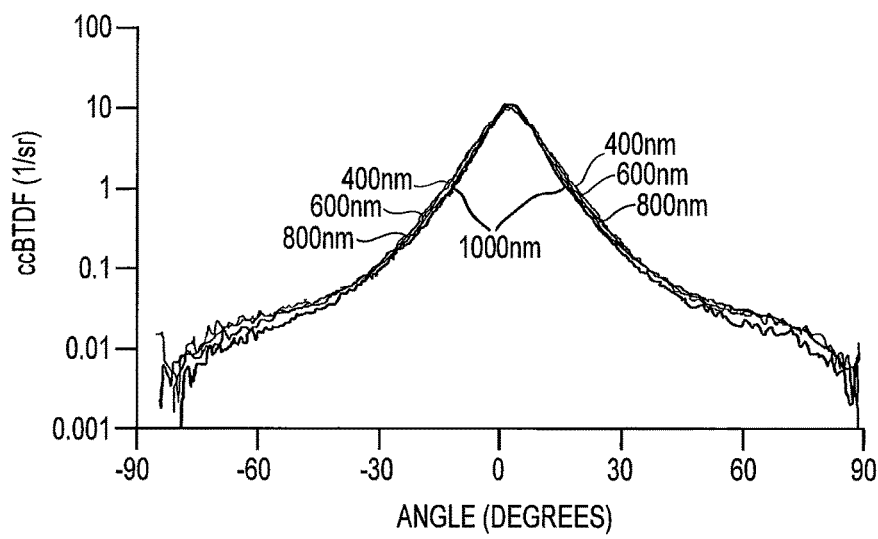
FIG. 6 shows angular scattering (i.e. corrected bidirectional transmittance distribution function (ccBTDF) in units of $(sr)^{-1}$) for a high haze light diffusive glass panel at 400, 600, 800 and 1000 nm, formed from Corning Incorporated's EAGLE XG® glass.

FIG. 6 shows angular scattering (i.e. corrected bidirectional transmittance distribution function (ccBTDF) in units of $(sr)^{-1}$) for a high haze light diffusive glass panel at 400, 600, 800 and 1000 nm.

Figure 7:
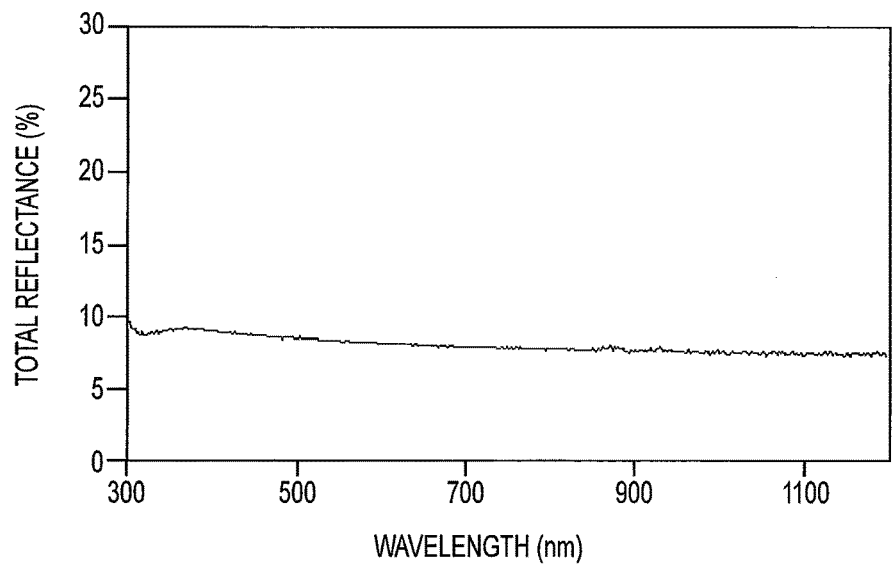
FIG. 7 shows total reflectance measurements for a high haze light diffusive glass panel formed from Corning Incorporated's EAGLE XG® glass.

FIG. 7 shows total reflectance measurements for a high haze light diffusive glass panel.

In one set of embodiments, a display device is disclosed herein comprising a MEMS device and a glass touch panel covering the MEMS device. The glass touch panel is comprised of Corning Incorporated's EAGLE XG® glass and has a CTE of $50 \times 10^{-7}/°$ C. or less, and a scatter ratio (diffuse transmittance divided by total transmittance) of 0.5 or more, the panel having opposing inner and outer surfaces, the inner surface facing the MEMS device in an inward direction, and the outer surface facing away from the MEMS device in an outward direction, the outer surface being textured by the two-step process, the inner surface being non-textured, the panel having a thickness of 1.1 mm or less between the inner and outer surfaces, the panel having a total forward transmission of 90% or more in the outward direction. The inner surface is flat and smooth.

In another set of embodiments, a display device is disclosed herein comprising a MEMS device and a glass touch panel covering the MEMS device. The glass touch panel is comprised of Corning Incorporated's EAGLE XG® glass and has a CTE of $50 \times 10^{-7}/°$ C. or less, and a scatter ratio (diffuse transmittance divided by total transmittance) of 0.5 or more, the panel having opposing inner and outer surfaces, the inner surface facing the MEMS device in an inward direction, and the outer surface facing away from the MEMS device in an outward direction, the outer surface being textured by the two-step process, the inner surface being non-textured, the panel having a thickness of about 0.3 mm between the inner and outer surfaces, the panel having a total forward transmission of 90% or more in the outward direction. The inner surface is smooth, and the MEMS device comprises a MEMS array disposed on the smooth inner surface. Thus, the textured outer surface would face the viewer with the viewer looking through the glass panel (or substrate) to the array. Ambient light, and/or a front light outside the display device, would reflect off the array back towards the viewer.

Figure 8:
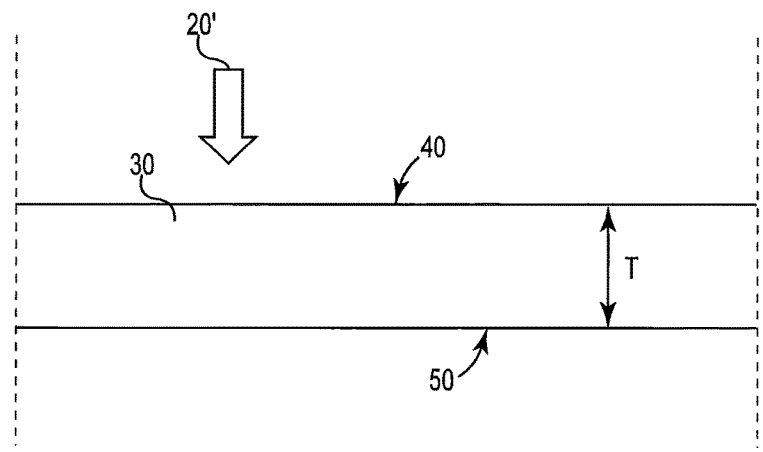
FIG. 8 schematically illustrates the fabrication of a display device disclosed herein comprising a MEMS device.
Figure 9:
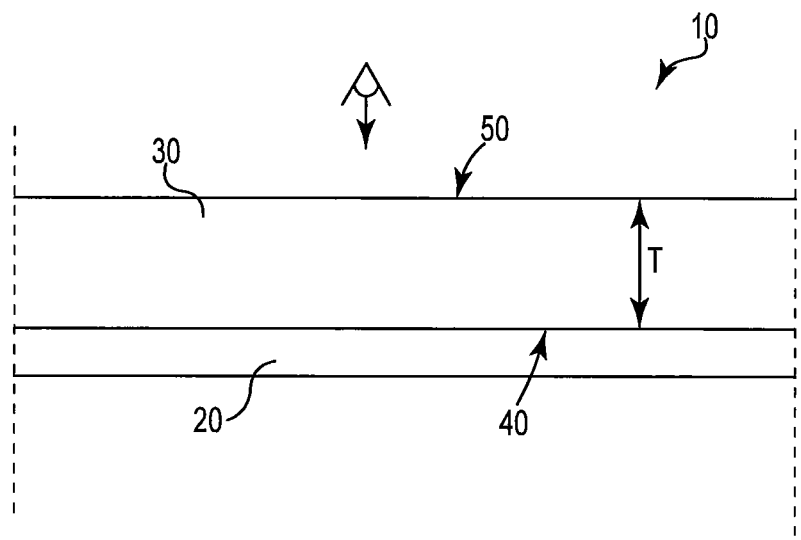
FIG. 9 schematically illustrates a display device disclosed herein comprised of a MEMS device that includes a MEMS array and a glass panel.

FIG. 8 schematically illustrates the fabrication of a display device disclosed herein comprising a MEMS device. A MEMS array is deposited on the smooth inner surface 40 of a glass panel 30, the inner surface 40 being opposite the textured outer surface 50. FIG. 9 schematically illustrates the display device 10 comprised of the completed MEMS device (including MEMS array) 20 and the glass panel 30.

In another set of embodiments, a display device is disclosed herein comprising an EPD device and a glass touch panel covering the EPD device. The glass touch panel is comprised of Corning Incorporated's EAGLE XG® glass and has a CTE of $50 \times 10^{-7}/°$ C. or less, and a scatter ratio (diffuse transmittance divided by total transmittance) of 0.5 or more, the panel having opposing inner and outer surfaces, the inner surface facing the EPD device in an inward direction, and the outer surface facing away from the EPD device in an outward direction, the outer surface being textured by the two-step process, the inner surface being non-textured, the panel having a thickness of less than about 1.1 mm between the inner and outer surfaces, the panel having a total forward transmission of 90% or more in the outward direction. In some embodiments, the EPD device comprises a TFT array disposed on a lower substrate, the TFT array facing a common electrode disposed on an upper substrate; the non-textured (smooth) inner surface of the glass panel is directly bonded to upper substrate, such that the textured outer surface would face the viewer with the viewer looking through the glass panel to the array; ambient light, and/or a front light outside the display device, would reflect off the array back towards the viewer; the glass panel thus acts as a cover glass. In other embodiments, the EPD device comprises a TFT array disposed on a lower substrate, the TFT array facing a common electrode disposed on the non-textured (smooth) inner surface of the glass panel (the glass panel then serving as the upper substrate), such that the textured outer surface would face the viewer with the viewer looking through the glass panel to the array; ambient light, and/or a front light outside the display device, would reflect off the array back towards the viewer; the glass panel thus acts as the upper substrate of the EPD device; such display devices preferably have no front polarizer.

Figure 10:
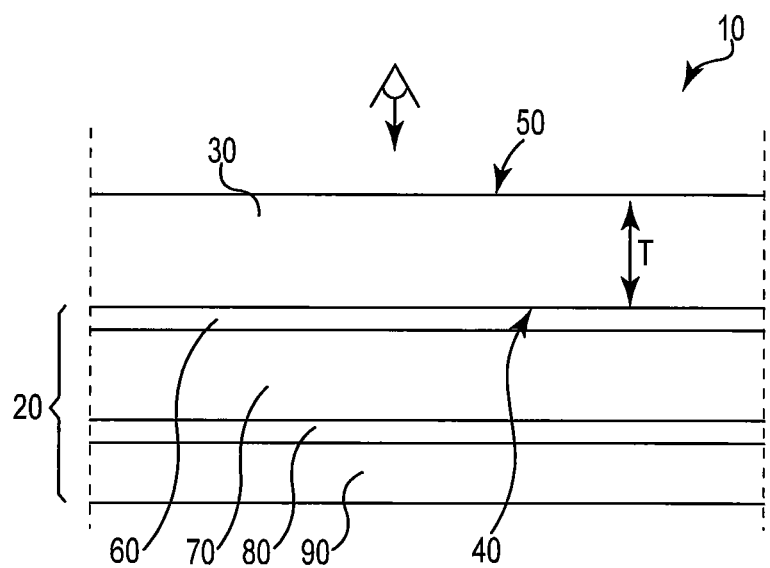
FIG. 10 schematically illustrates a display device disclosed herein comprised of an EPD device and a glass panel, where the glass panel serves as the common electrode substrate of the EPD device.
Figure 11:
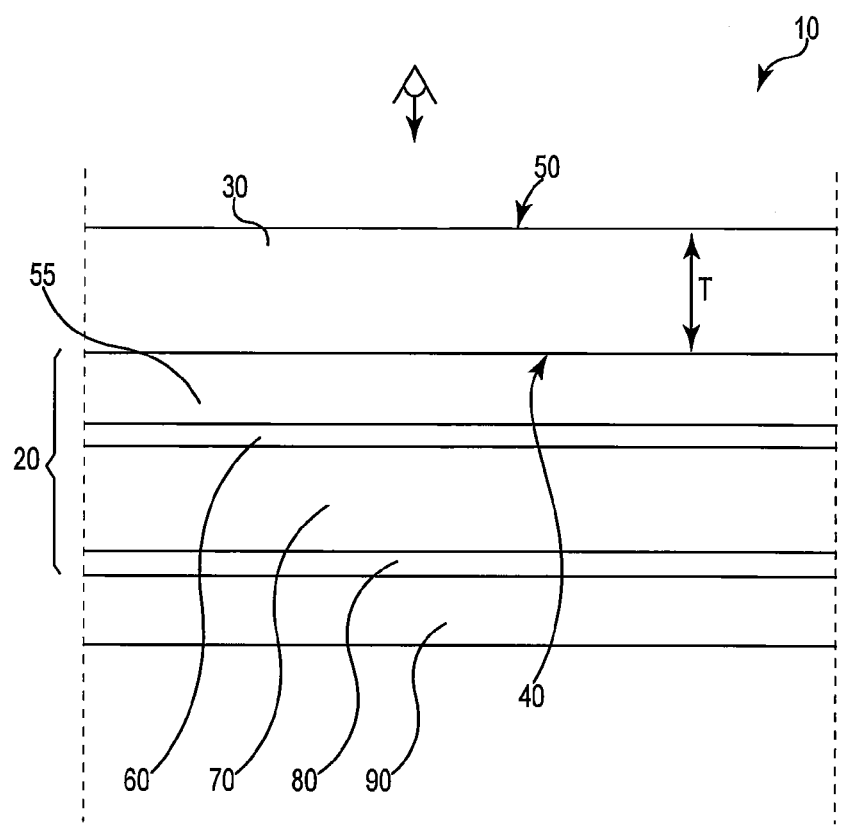
FIG. 11 schematically illustrates a display device disclosed herein comprised of a cover glass and a display element, such as a light-reflective device, for example an EPD device.

In another set of embodiments, a display device is disclosed herein comprising an EPD device and a glass touch panel covering the EPD device. Referring to FIGS. 10 and 11, the EPD device is comprised of a TFT substrate 90, a TFT array 80 disposed on the TFT substrate, a common electrode substrate, a common electrode 60 disposed on the common electrode substrate, and ink capsules 70 disposed between the common electrode 60 and the TFT array 80. FIG. 10 schematically illustrates a display device disclosed herein comprised of an EPD device and a glass panel 30, where the glass panel 30 serves as the common electrode substrate of the EPD device. In some embodiments, the glass panel 30 is Corning Incorporated's EagleXG® glass. FIG.

11 schematically illustrates a display device disclosed herein comprised of a display element such as a light-reflective device, for example an EPD device, and a cover glass panel 30, wherein the outer surface 50 is textured. The cover glass panel 30 can be Corning Incorporated's Gorilla® glass, and the common electrode substrate 55 can be Corning Incorporated's EagleXG® glass. The cover glass panel 30 can be bonded to the common electrode substrate 55.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass panel comprising an alkaline earth boro-aluminosilicate glass or an aluminosilicate glass, the glass panel having opposing first and second major surfaces and a thickness therebetween equal to or less than 1.1 mm, the glass panel further comprising a scatter ratio equal to or greater than 0.5 for all wavelengths between 300 and 1200 nm and a CTE in a range from $30 \times 10^{-7}/°C$ to $50 \times 10^{-7}/°C$, and wherein the first surface is uncoated and textured, a correlation length of the texture is greater than 500 nanometers and less than 2 micrometers and an RMS roughness of the textured first surface is greater than 250 nanometers and less than 1.5 nanometers.

2. The glass panel according to claim 1, wherein the glass panel has a scatter ratio of 0.90 or more for all wavelengths between 300 and 1200 nm.

3. The glass panel according to claim 1, wherein the first surface of the glass panel exhibits a ccBTDF of greater than $0.07 \, (sr)^{-1}$ between −30 and +30 degrees about a normal axis to the first surface of the glass panel.

4. The glass panel according to claim 3, wherein the first surface of the glass panel exhibits a ccBTDF of greater than $0.10 \, (sr)^{-1}$ between −20 and +20 degrees about a normal axis to the outer surface of the glass panel.

5. The glass panel according to claim 1, wherein the correlation length is greater than 750 nm and lower than 1.5 microns.

6. The glass panel according to claim 1, wherein the RMS roughness is greater than 500 nm and less than 1.25 microns.

7. The glass panel according to claim 1, wherein the second surface is non-textured.

8. The glass panel according to claim 1, wherein the second surface is flat.

9. The glass panel according to claim 1, wherein the second surface of the glass panel is a polished surface.

10. The glass panel according to claim 1, wherein the glass panel forms a portion of a display device, the display device comprising a display element and the glass panel, wherein the glass panel is positioned adjacent to the display element.

* * * * *

UNITED STATES PATENT AND TRADEMARK OFFICE
CERTIFICATE OF CORRECTION

PATENT NO. : 10,330,830 B2
APPLICATION NO. : 14/605255
DATED : June 25, 2019
INVENTOR(S) : Nicholas Francis Borrelli et al.

Page 1 of 1

It is certified that error appears in the above-identified patent and that said Letters Patent is hereby corrected as shown below:

On the Title Page

Column 2, item (56), other publications, Line 2, delete "scarttering"" and insert -- scattering" --, therefor.

Signed and Sealed this
Twenty-second Day of October, 2019

Andrei Iancu
*Director of the United States Patent and Trademark Office*